(12) United States Patent
Lum et al.

(10) Patent No.: US 9,619,047 B2
(45) Date of Patent: Apr. 11, 2017

(54) OPTICAL FINGER NAVIGATION DEVICE

(75) Inventors: Chee Foo Lum, Penang (MY); Sai Mun Lee, Penang (MY); Khoon Guan Tee, Taman Bagan Lalang (MY); Hun Kwang Lee, Panang (MY)

(73) Assignee: PIXART IMAGING INC., Hsin-Chu (TW)

( * ) Notice: Subject to any disclaimer, the term of this patent is extended or adjusted under 35 U.S.C. 154(b) by 750 days.

(21) Appl. No.: 12/912,281

(22) Filed: Oct. 26, 2010

(65) Prior Publication Data
US 2012/0098792 A1    Apr. 26, 2012

(51) Int. Cl.
*G06F 3/03* (2006.01)

(52) U.S. Cl.
CPC .................................. *G06F 3/0317* (2013.01)

(58) Field of Classification Search
USPC .................................................. 345/163–166
See application file for complete search history.

(56) References Cited

U.S. PATENT DOCUMENTS

| 5,182,445 | A | 1/1993 | Yamashita |
| 5,399,850 | A | 3/1995 | Nagatani et al. |
| 7,408,718 | B2 | 8/2008 | Smith |
| 2002/0167489 | A1* | 11/2002 | Davis ............................ 345/157 |
| 2007/0131946 | A1* | 6/2007 | Spurlock ............... G06F 3/0304 257/82 |
| 2009/0267919 | A1* | 10/2009 | Chao et al. ................... 345/175 |
| 2011/0122060 | A1* | 5/2011 | Westerweck ........ G02B 27/0977 345/156 |
| 2012/0026093 | A1* | 2/2012 | Duparre et al. .............. 345/166 |
| 2012/0086018 | A1* | 4/2012 | Yao et al. ........................ 257/82 |

FOREIGN PATENT DOCUMENTS

| KR | 2003/0048254 | 6/2003 |
| WO | WO-2010/081652 | 7/2010 |

* cited by examiner

*Primary Examiner* — Amr Awad
*Assistant Examiner* — Andre Matthews
(74) *Attorney, Agent, or Firm* — Li & Cai Intellectual Property (USA) Office

(57) ABSTRACT

An optical finger navigation (OFN) device for use in handheld portable devices is presented. The OFN device may include a light source, a sensor, a lens holder integrated with a light guide system and a molded lead frame. The lens holder may include a lens receiving region for receiving the lens, a light guide system for directing light emitted by the light source towards the navigation surface. The light guide system may include a slanted wall that may be coated with a light reflective material.

13 Claims, 6 Drawing Sheets

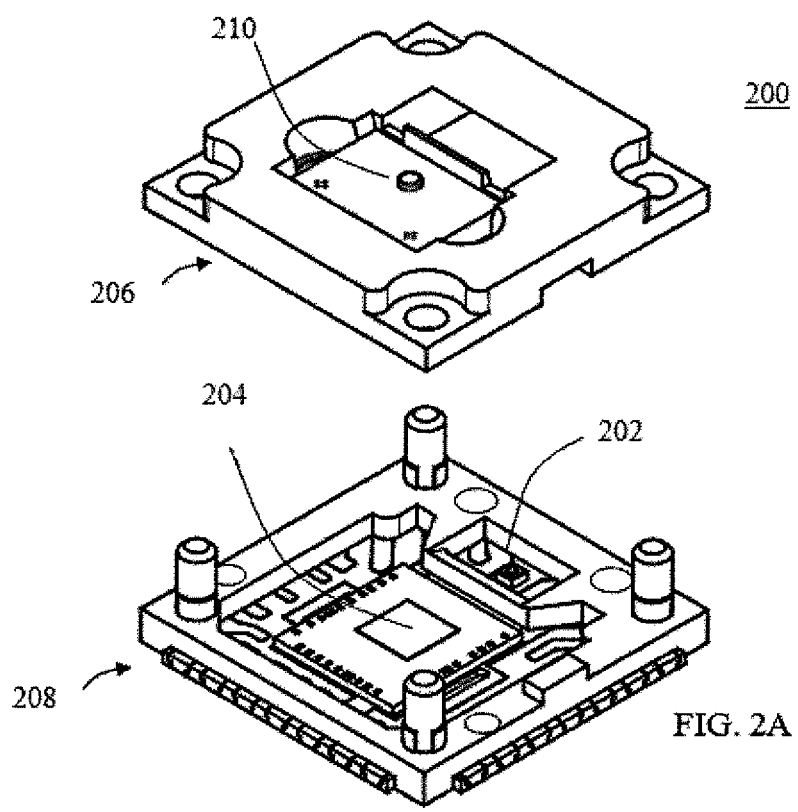
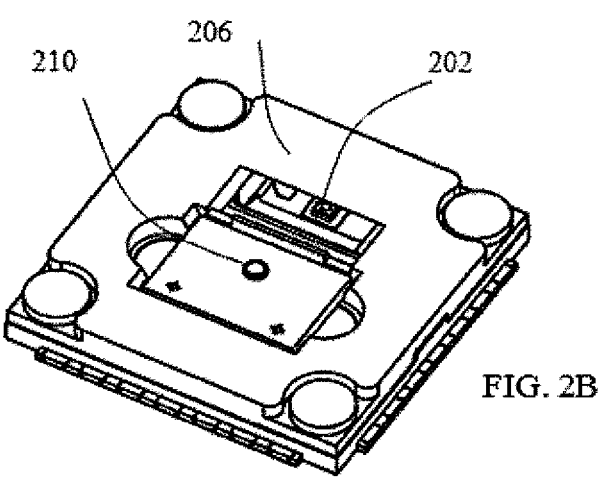

OPTICAL FINGER NAVIGATION DEVICE

BACKGROUND

Optical navigation sensors are conventionally used for surface navigation devices, such as an optical mouse for desktop computers. In general, an optical navigation device tracks the relative movement between the navigation surface and the sensor within the navigation device.

More recently, optical finger navigation devices have been widely used in many handheld portable devices to provide a navigation function by finger operation. In contrast to a conventional optical mouse system, an optical finger navigation device uses a light source to illuminate a user's finger and a sensor to generate the images from light that is reflected off the user's finger. The general operational concept of an optical finger navigation device is somehow similar to a conventional optical mouse, except that the sensor incorporated in for finger navigation is generally positioned facing upward from the device, rather than downward. In addition, the tracking surface for the optical finger navigation system is a user's finger, rather than a desktop work surface. Accordingly, an optical finger navigation device translates the movement of a finger into movement of a cursor on a display of a corresponding handheld portable device. Whereas a conventional optical navigation system translates the movement of a mouse over a work surface into the movement of a cursor on a computer display.

An optical navigation system can be effectively used in many small portable devices such as cell phone, PDAs, etc. However, as the size of such a device continues to be reduced and becomes more compact in design, the optical navigation device is allotted a smaller and smaller footprint for assembly and operation. Accordingly, the overall package size and the height of the optical navigation device must continue to shrink. Hence it has become difficult to produce such small optical finger navigation systems for use in compact portable devices. As the package size becomes smaller, the manufacturing process of optical finger navigation devices inevitably becomes more complex and expensive. Therefore, a small profile optical navigation device that can be manufactured easily and more inexpensively is desirable. In addition, an optical navigation device with fewer component parts that would enable reduced assembly and raw material component costs is desirable.

BRIEF DESCRIPTION OF THE DRAWINGS

Throughout the description and figures, similar reference numbers may be used to identify similar elements.

FIG. 2A illustrates a top perspective view of a partially completed optical finger navigation device;

FIG. 2B illustrates a top perspective view of a completed optical finger navigation device;

DETAILED DESCRIPTION

Figure 1:
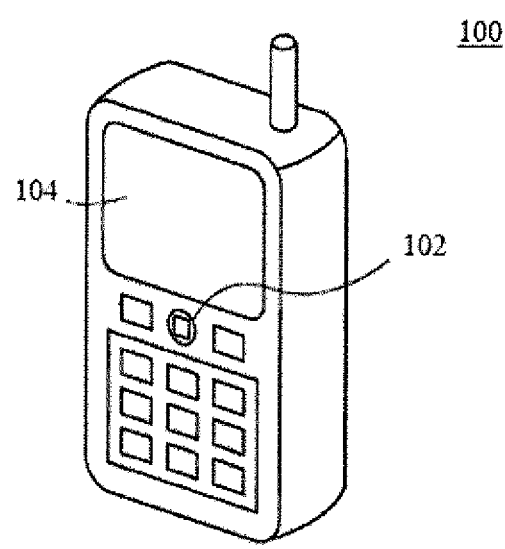
FIG. 1 illustrates a perspective view of a handheld device with an optical finger navigation device.

Optical finger navigation (hereinafter OFN) devices are suitable for small handheld electronic appliances, such as cell phones, PDAs or portable music players that normally require a navigation function. FIG. 1, illustrates an example of a hand held device 100, which includes an OFN device 102. The OFN device 102 allows the user to manipulate the navigation functions on the display 104 of a handheld device 100 with a finger (not shown). For example, the OFN device 102 facilitates the control of a cursor within the display 104 of the handheld device 100. FIG. 1 specifically illustrates a handheld mobile phone. However, the OFN device 102 may be integrated in other electronic devices, such as those listed above, in order to provide various navigation operations.

As described in detail below, an OFN device 200 is provided such that it can be effectively deployed in many portable devices. More particularly, the OFN device 200 is suitable for use in small and compact portable devices. FIGS. 2A and 2B illustrate a top perspective view of an OFN device 200. The illustrated OFN device 200 may include a light source 202, a sensor 204, a lens holder 206 and a molded lead frame 208. There may also be a lens 210 attached to or within the lens holder 106 for directing light towards the sensor 204. It should be noted that the configuration of the OFN device 200 is not limited to particular hardware components or software implementations.

Although the illustrated OFN device 200 is shown and described herein with certain components and functionality, other embodiments of OFN device 200 may include fewer or more components or having more or less functionality. For example, some embodiments of OFN device 200 may include circuitry and hardware embedded therein to provide a finger navigation function as well as a free space or scene navigation. In such an embodiment, the sensor 204 may be configured to generate a surface navigation signal in response to a surface navigation image and also a free space navigation signal in response to free space navigation image.

In one embodiment, as illustrated in FIGS. 2A and 2B, the OFN device 200 may be used in a portable device for providing finger navigation operation. The OFN device 200 may include a light source 202 configured to emit light. The light source 202 may be a coherent light source, such as a LED or a non-coherent light source such as a laser LED. In addition, the light source 202 may be a visible LED or a non-visible light (e.g. IR LED). The selection of the light source 202 is normally determined by the application. However, it should be noted that certain applications may require more than one light source 202. In one embodiment, the light source 202 and the sensor 204 may be attached and electrically connected to the molded lead frame 208 by means of one or more wire bonds (not shown). In another embodiment, as illustrated in FIG. 2B, the OFN device 200 may include a lens holder 206 that may be coupled with the molded lead frame 208 to form the OFN device 200.

Figure 3:
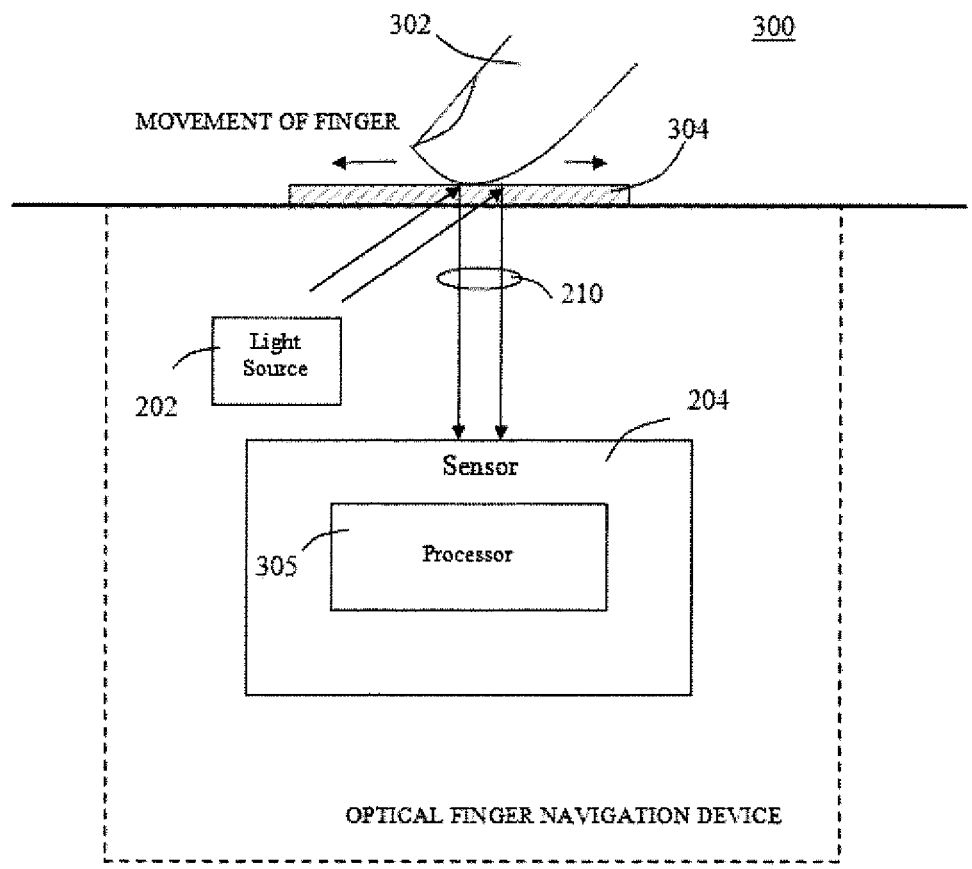
FIG. 3 illustrates a simplified block diagram representing the operation of an optical finger navigation device.

FIG. 3 illustrates a simplified block diagram showing the operation of an OFN device 300. In one embodiment, as shown in both FIGS. 1 and 3, the sensor 204 may be configured to track a movement of a finger 302 above the OFN navigation surface 304. The OFN device 300 may include a navigation surface 304 or a designated touch region for a user to place an object (eg. finger 302) for operating the navigation function of the electronic device. Although other objects such as a stylus, pen, stylus pen, or other similar objects could be used to operate the OFN device. However, to simplify the illustration, a human finger 302 is used to represent the object throughout the description of the embodiments and their figures.

The sensor 204 is operable to receive light reflected from the finger 302 and subsequently generates a signal in response to the detected light. The sensor 204 may capture multiple images representing the surface features (not shown) of the finger 302 and compare these images to determine the movement of the surface features between the images. The OFN device 300 may include a lens 210 to direct the reflected light towards the sensor 204. The sensor 204 may further include a processor 305 to compare or cross correlate the images captured and determine the relative motion between the finger 302 and the navigation surface 304 in terms of movement vectors in the directional delta X and delta Y, corresponding to the movement of the finger 302 relative to the navigation surface 304. The sensor 204 may subsequently process and further translate the determined motion data to a corresponding cursor movement or an input function on the handheld device. In one embodiment, the sensor 204 may be any type of optical sensor known in the art, such as a photo-detector, a Charge Couple Device (CCD), a Complimentary Metal Oxide Semiconductor (CMOS) sensor, or other similar sensor type devices.

Figures 4A, 4B:
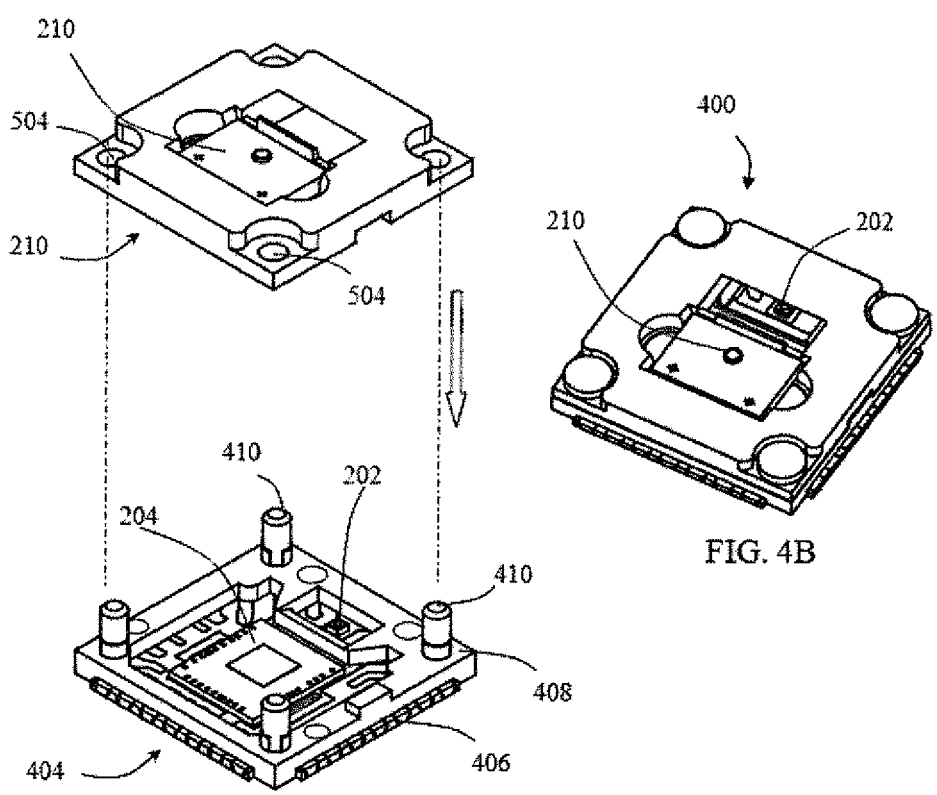
FIG. 4A illustrates a top perspective view of a partially completed optical finger navigation device being assembled.
FIG. 4B a top perspective view of an optical finger navigation device after assembly.

FIG. 4 illustrates an OFN package assembly. For clarification, the terms OFN device and OFN package are interchangeable throughout this application. The OFN device, for example, OFN device 200 in FIG. 2, is the same as OFN package 400 in FIG. 4. As from the packaging assembly perspective, the OFN device 200 may include a semiconductor package, which is in the form a quad flat pack no-lead (QFN) package. Although the QFN is discussed herein for packaging, other types of surface mount packages such as ball grid array package may be utilized, depending on the application and design requirements. In one embodiment, the OFN package 400 may include a lens holder sub-assembly 402 and a molded lead frame sub-assembly 404. The lens holder sub-assembly 402 may include a lens 210 attached thereto. The lens holder sub-assembly 402 may form a top cover for the OFN package 400 which provides protection for the light source 202 and the sensor 204 disposed in the package. The lens holder sub-assembly 402 may include a lens receiving region 502 (shown in FIG. 5), a plurality of through holes 504 and a light guide system 508 (shown in FIG. 5). The functions of the lens receiving region 502, the through holes 504 (hereinafter holes) and the light guide system 508 will be elaborated on in more detail herein below.

In one embodiment, the molded lead frame sub-assembly 404 may include a lead frame 406, such as a quad flat pack no-lead (QFN) lead frame, a base 408, a light source 202 and a sensor 204 attached to the lead frame 406. The base 408 may include a plurality of pins 410 whereby the pins 410 may be configured to mate with the holes 504 of the lens holder sub-assembly 402. The pins 410 and the through holes 504 are configured to lock the lens holder sub-assembly 402 and the molded lead frame sub-assembly 404 together to form the OFN package 400.

In one embodiment, the pins 410 and the holes 504 may be configured to mate together by a heat process. The pins 410 pass through corresponding holes 504 and an end portion of the pins 410 is protruded from the corresponding holes 504. During the heat staking process the pins 410 are heated and the end portion of each of the pins 410 is deformed into a protrusion that has a diameter larger than a diameter of the pins 410 such that the protrusion becomes a lock structure and the pins 410 are locked within the holes 504, respectively. For example, to assemble a OFN package 400, a heat staking process may be deployed to mate the pins 410 and the holes 504 together. The process of heat staking comprises the application of heat to suitably melt the mold material (or plastics), of which these two components (pins 410 and holes 504) are made, and subsequently cause the end portion of each of the pins 410 is deformed into a protrusion that has a diameter larger than a diameter of the pins 410 such that the protrusion becomes a lock structure. The heat staking process typically requires the temperature of the stake to be just high enough to reset the plastics memory of the mating components without being hot enough to actually melt the plastic. Therefore, by knowing the exact temperature, pressure, time and the thermal characteristics of the material, the heat staking process can be effectively employed in the assembly of the OFN package 400.

Figure 5A:
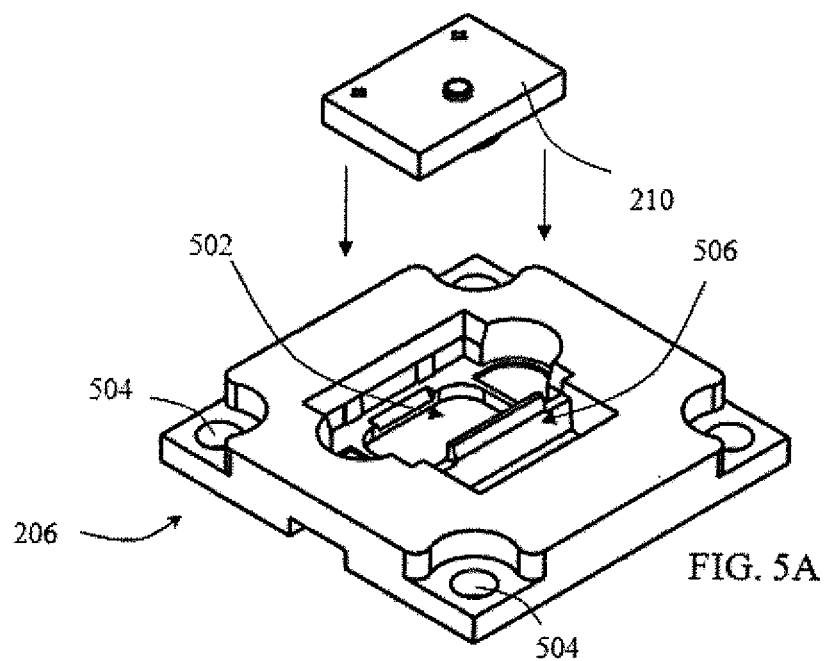
FIG. 5A illustrates a top perspective view of a lens holder sub-assembly and a lens prior to insertion.

FIG. 5A illustrates a top perspective view of a lens holder 206. In one embodiment, the lens holder 206 may be of a unitary structure or a single piece component that may be fabricated prior to being coupled with the molded lead frame 208 (shown in FIG. 4). The lens holder 206 may be formed by means of a molding process. In one embodiment, the molding process may include a transfer molding process, casting or any other suitable methods and processes may also be employed to perform the same. Although a molding process is discussed herein, other processes may be utilized, depending on design, manufacturing and cost requirements, such as cutting, laser cutting, stamping, or other similar processes. The lens holder 206 may include a light opaque material (not shown) which may minimize the optical cross talk and interference within the package. The light opaque material may attenuate a light wave that is within a certain frequency range. For example, for an infrared light opaque material, the opaque material may absorb or filter infrared light that is in the frequency range of 700-1200 nanometers.

Figure 5B:
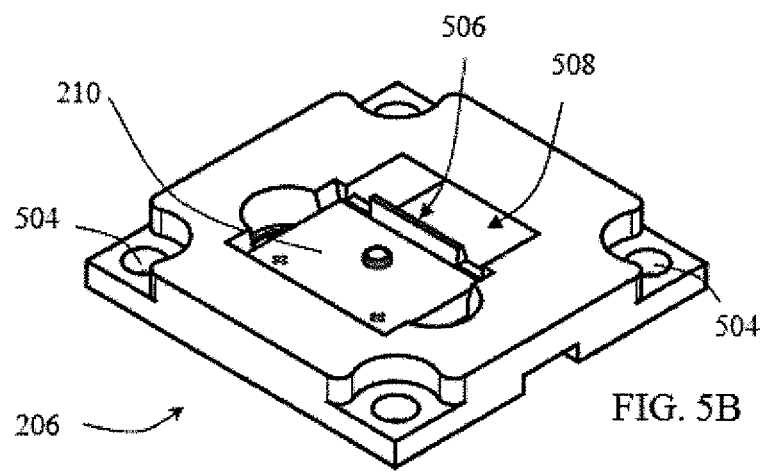
FIG. 5B illustrates a top perspective view of a lens holder sub-assembly with a lens.

FIG. 5B illustrates a top perspective view of a lens holder 206 with a lens 210 disposed therein. In one embodiment; the lens holder 206 may include a lens receiving region (502 in FIG. 5A) for receiving the lens 210. A lens 210 may be disposed within the lens holder 206 by applying adhesive means, such as glue. In an alternate embodiment, the lens holder 206 may include a mechanical locking mechanism 506 for engaging and retaining the lens. The mechanical locking mechanism 506 may include a latch, a hook, a protruded tongue, a screw, a wedge, or other similar mechanical retention means, whereby the lens 210 can be fixedly disposed and retained within the lens holder without any adhesive means.

Figure 6A:
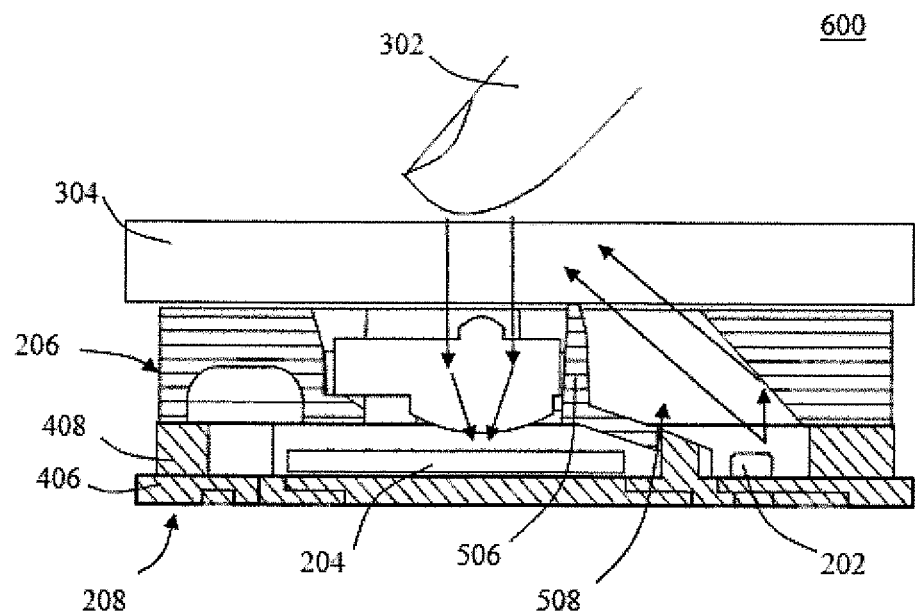
FIG. 6A illustrates a side, cut-away view of an optical finger navigation device.
Figure 6B:
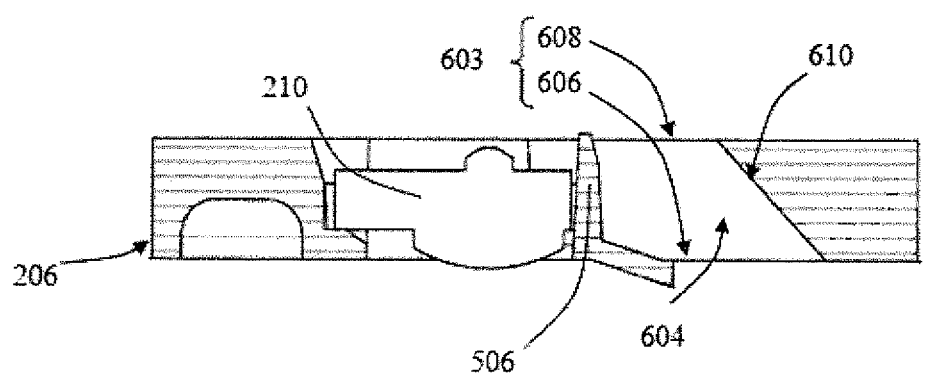
FIG. 6B illustrates a side cut-away view of a lens holder sub-assembly.

FIG. 6A illustrates a side cut-away view of an OFN device 600, whereas FIG. 6B illustrates a side, cut-away view of a lens holder 206. In one embodiment, the lens holder 206 may include a light guide system 508 (shown in FIG. 6A) for directing light emitted by the light source 202 towards the navigation surface 304. In another embodiment, the light guide system 508 may include an aperture system 603 defined by a cavity 604 (shown in FIG. 6B). In one embodiment, the aperture system 603 may include an input aperture 606 and an output aperture 608. The light guide system 508 may further include at least one surface 610 extending between the input aperture 606 and output aperture 608, whereby the light emitted by the light source 202 enters light guide system 508 via the input aperture 606 and exits via the output aperture 608.

In one embodiment, the surface 610 may be slanted at an angle to reflect at least a portion of the light emitted by the light source 202 towards the navigation surface 304. Specifically, the input aperture 606 may be located adjacent to the light source 202, whereas the output aperture 608 is located adjacent to the navigation surface 304, respectively. The output aperture 608 is configured relative to the configuration of the input aperture 606 in such a manner that the cavity 604 defined thereby is configured to direct the emitted light towards the navigation surface 304. In one embodiment at least a portion of the light guide system 508, for example, the slanted wall 610, may be coated with a light reflective material to enhance its surface reflectivity.

From the embodiments described with reference to FIGS. 6A and 6B, it is obvious that the OFN device 600 may not require an illumination lens that is normally found in many conventional OFN device design. The illumination lens is generally needed in many designs for collimating the light efficiently toward a navigation surface 304. Thus, with the embodiments as described above, the light guide system 508 may provide an efficient means to channel or direct the emitted light towards the navigation surface 304, which may therefore, make the illumination lens unnecessary.

The embodiments described above and with reference to FIGS. 1-6 may provide an effective means for fabricating a small ONF device 100 by a simple assembly process and low manufacturing cost. The implementation of a prefabricated, molded lead frame sub-assembly and a lens holder sub-assembly to form the OFN package has minimized, if not completely eliminated, many potential product defects that are commonly associated with or inherent in a typical package fabrication method, whereby the package is normally encapsulated with a plastic material using a molding process. Therefore, by attaching two prefabricated sub-assembled components together utilizing a heat stake process, as taught herein, many typical defects, such as wire debonding and other physical and chemical damage that are commonly induced with a typical molding process, may be avoided.

In another exemplary embodiment, the OFN device is the form of a quad flat pack no-lead (QFN) package, therefore it may be attached to the mother board of the portable device via surface mounting process. As the surface mount technology generates less heat than to a typical solder flow process, damages such as die delamination and package warpage that could be induced by solder reflow may be eliminated by the embodiments discussed herein.

In one embodiment, the demand for a low cost and a smaller package profile may also be satisfied. For example, since the fabrication of the OFN package involves only the mating of two sub-assembled components together. Therefore, the cost of manufacturing is relatively lower. Furthermore, a simpler fabrication process may contribute to a higher production yield, which may further reduce the overall manufacturing cost. Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical finger navigation device comprising:
   a light source configured to emit light;
   a sensor configured to receive light from a navigation surface;
   a molded lead frame comprising a base with a plurality of pins;
   a lens configured to direct light from the navigation surface toward the sensor; and
   a lens holder molded to form a unitary structure, the lens holder comprising:
      a lens receiving region configured to receive the lens;
      a light guide system for directing the emitted light towards the navigation surface in a light path that extends from the light source to the navigation surface; the light guide system comprising an aperture system that defines a cavity that passes through the lens holder; that is aligned with the light source; and that is configured to direct the emitted light from the light source towards the navigation surface in the light path; and
      a plurality of through holes, wherein the plurality of pins and the plurality of through holes mate together via a heat staking process, and wherein each of the plurality of pins passes through a corresponding through hole of the plurality of through holes and an end portion of the each of the plurality of pins is protruded from the corresponding through hole, and during the heat staking process the plurality of pins is heated and the end portion of each of the plurality of pins is deformed into a protrusion that has a diameter larger than a diameter of the plurality of pins such that the protrusion becomes a lock structure and the plurality of pins is locked within the plurality of through holes, respectively.

2. The optical finger navigation device of claim 1, wherein the cavity comprises an input opening nearest the light source where the emitted light enters the cavity and an output opening nearest the navigation surface where the emitted light exits the cavity, the aperture system that defines the cavity having at least one surface extending between the input and the output of the cavity, the at least one surface being slanted at an angle to reflect at least a portion of the emitted light towards the navigation surface, wherein there is no illumination lens located in the entire light path between the light source and the navigation surface, and wherein the at least one slanted surface is coated with a light reflective material.

3. The optical finger navigation device of claim 1, wherein the lens holder comprises a material that is opaque to light within a specific wavelength range.

4. The optical finger navigation device of claim 1, wherein the lens is disposed in the lens holder with an adhesive.

5. The optical finger navigation device of claim 1, wherein the molded lead frame further comprises a lead frame.

6. The optical finger navigation device of claim 5, wherein the light source and the sensor are disposed on and electrically connected to the lead frame.

7. The optical finger navigation device of claim 1, wherein the at least one surface extending between the input and the output is slanted at a non-normal angle relative to a major surface of the lens holder.

8. The optical finger navigation device of claim 1, wherein there is no collimating lens located between the light source and the navigation surface.

9. An optical finger navigation package comprising:
   a molded lead frame sub-assembly comprising a quad flat pack no-lead (QFN) lead frame, a base having a plurality of pins, a light source, and a sensor; and
   a lens holder sub-assembly comprising a lens, a lens receiving region, a plurality of through holes configured to mate with the plurality of pins of the base, and a light guide system;

wherein the light guide system is configured to direct light emitted by the light source towards a navigation surface in a light path that extends from the light source to the navigation surface;

wherein the light guide system comprises an aperture system that defines a cavity that passes through the lens holder sub-assembly, that is aligned with the light source, and that is configured to direct the emitted light from the light source towards the navigation surface in the light path;

wherein the plurality of pins and the plurality of through holes mate together via a heat staking process, and wherein each of the plurality of pins passes through a corresponding through hole of the plurality of through holes and an end portion of the each of the plurality of pins is protruded from the corresponding through hole, and during the heat staking process the plurality of pins is heated and the end portion of each of the plurality of pins is deformed into a protrusion that has a diameter larger than a diameter of the plurality of pins such that the protrusion become a lock structure and the plurality of pins is locked within the plurality of through holes, respectively; and a lens coupled to the lens receiving region of the lens holder sub-assembly and configured to direct light from the navigation surface towards the sensor.

10. The optical finger navigation system of claim 9, wherein the cavity comprises an input opening nearest the light source where the emitted light enters the cavity and an output opening nearest the navigation surface where the emitted light exits the cavity, wherein the aperture system that defines the cavity comprises at least one surface extending between the input and the output of the cavity, the at least one surface being slanted at an angle to reflect at least a portion of the emitted light towards the navigation surface, and wherein there is no illumination lens located in the entire light path between the light source and the navigation surface.

11. An optical finger navigation system, comprising:
a light source configured to emit light;
a light sensor configured to receive light from a navigation surface;
a molded lead frame comprising a lead frame and a base having a plurality of pins;
a single lens configured to direct light from the navigation surface toward the light sensor; and
a lens holder molded to form a unitary structure, the lens holder comprising:
  a lens receiving region configured to receive and retain the single lens;
  a light guide system that directs the emitted light toward the navigation surface in a light path that extends from the light source to the navigation surface; and
  a plurality of through holes configured to mate with the plurality of pins of the base, wherein the plurality of pins and the plurality of through holes mate together via a heat staking process, and wherein each of the plurality of pins passes through a corresponding through hole of the plurality of through holes and an end portion of the each of the plurality of pins is protruded from the corresponding through hole, and during the heat staking process the plurality of pins is heated and the end portion of each of the plurality of pins is deformed into a protrusion that has a diameter larger than a diameter of the plurality of pins such that the protrusion becomes a lock structure and the plurality of pins is locked within the plurality of through holes, respectively.

12. The optical finger navigation system of claim 11, wherein the light source and the sensor are disposed on and electrically connected to the molded lead frame.

13. The optical finger navigation system of claim 11, wherein the single lens is disposed in the lens holder with an adhesive.

* * * * *